(12) United States Patent
Badano et al.

(10) Patent No.: US 9,376,326 B2
(45) Date of Patent: Jun. 28, 2016

(54) METHOD FOR MODIFYING A HOT WALL AMMONIA REACTOR WITH VESSEL HAVING A PARTIAL OPENING

(75) Inventors: Marco Badano, Como (IT); Mirco Tarozzo, Ligornetto (CH); Federico Maffietti, Cormano (IT)

(73) Assignee: Casale SA (CH)

( * ) Notice: Subject to any disclaimer, the term of this patent is extended or adjusted under 35 U.S.C. 154(b) by 50 days.

(21) Appl. No.: 13/583,128

(22) PCT Filed: Mar. 11, 2011

(86) PCT No.: PCT/EP2011/053671
§ 371 (c)(1),
(2), (4) Date: Sep. 6, 2012

(87) PCT Pub. No.: WO2011/124439
PCT Pub. Date: Oct. 13, 2011

(65) Prior Publication Data
US 2013/0014365 A1    Jan. 17, 2013

(30) Foreign Application Priority Data
Apr. 9, 2010 (EP) .................................... 10003825

(51) Int. Cl.
| | | |
|---|---|---|
| *B01J 8/00* | (2006.01) |
| *B01J 8/02* | (2006.01) |
| *B01J 8/04* | (2006.01) |
| *B01J 19/00* | (2006.01) |
| *B01J 19/24* | (2006.01) |
| *C01C 1/00* | (2006.01) |
| *C01C 1/02* | (2006.01) |
| *C01C 1/04* | (2006.01) |

(52) U.S. Cl.
CPC .......... *C01C 1/0417* (2013.01); *Y10T 29/49716* (2015.01)

(58) Field of Classification Search
CPC ......... A01N 59/00; A01N 37/16; B01J 19/00; B01J 8/00; B82Y 40/00; C01C 1/00; C01C 1/02; C01C 1/04; C01C 1/0405; C01C 1/0417; C01C 1/0423
USPC .................................................. 422/129, 148
See application file for complete search history.

(56) References Cited

U.S. PATENT DOCUMENTS

| | | | |
|---|---|---|---|
| 4,181,701 A | 1/1980 | Topsoe et al. | |
| 4,372,920 A * | 2/1983 | Zardi ............................ 422/148 |

(Continued)

OTHER PUBLICATIONS

International Preliminary Report on Patentability issued in connection with PCT/EP2011/053671, completed on Aug. 3, 2012.

(Continued)

*Primary Examiner* — Natasha Young
(74) *Attorney, Agent, or Firm* — Akerman LLP

(57) ABSTRACT

Method for modifying a hot wall ammonia reactor con vessel (2) having partial opening, comprising: assembly directly inside the vessel (2) of a catalytic cartridge (7) with modular elements, said modular elements being of a size compatible with introduction into the vessel through a pre-existing partial opening (6) of the vessel, and each comprising at least one panel (11); the panels (11) of said modular elements forming a substantially cylindrical outer wall (7a) of said cartridge (7), and an annular flux space (8) between said outer wall of the cartridge and an inner wall of the vessel; said panels (11) being provided with a respective heat insulation layer (13) before introduction into the vessel (2).

7 Claims, 4 Drawing Sheets

(56) References Cited

U.S. PATENT DOCUMENTS

| | | | |
|---|---|---|---|
| 4,374,095 A * | 2/1983 | Legg et al. | 422/218 |
| 5,236,671 A | 8/1993 | Grotz | |
| 5,779,988 A | 7/1998 | Zardi et al. | |
| 7,588,740 B1 * | 9/2009 | Guarino et al. | 422/218 |
| 2009/0047195 A1 | 2/2009 | Filippi et al. | |
| 2010/0278701 A1 * | 11/2010 | Tarozzo et al. | 422/211 |

OTHER PUBLICATIONS

International Search Report issued in connection with PCT/EP2011/053671, mail on Jun. 22, 2011.

Response to Written Opinion in connection with PCT/EP2011/053671, received on Mar. 22, 2012.

* cited by examiner

METHOD FOR MODIFYING A HOT WALL AMMONIA REACTOR WITH VESSEL HAVING A PARTIAL OPENING

This application is a national phase of PCT/EP2011/053671, now WO 2011/124439, filed Mar. 11, 2011, and claims priority to EP 10003825.6, filed Apr. 9, 2010, the entire contents of both of which are hereby incorporated by reference.

FIELD OF APPLICATION

The invention concerns a method for modifying a hot wall ammonia reactor with vessel having a partial opening.

In the present description, the term hot wall means a reactor with no fluxing system of the vessel (passage of a cooling stream between catalytic bed and vessel) where, in operation the vessel reaches substantially the temperature of the bed.

The term of reactor having partial opening means a reactor with no opening having substantially the same size as the diameter of the vessel.

PRIOR ART

A well known type of reactor for ammonia synthesis comprises a substantially cylindrical outer vessel, and a cartridge containing the catalyst (catalytic bed). The fresh charge of reactant gas which is essentially a mixture of nitrogen and hydrogen is circulated in an annular space (so-called annulus) between said vessel and said cartridge, in order to cool the wall of the vessel. This provision is known as fluxing the annulus, and the reactor is known as cold wall. For example, an ammonia reactor with fluxing of the annulus is described in U.S. Pat. No. 4,181,701.

The cooling of the vessel is considered to be appropriate since the steel vessel is exposed to a highly aggressive environment. There is also a known type of reactor called hot wall, in which there is not the aforementioned flux. This is made possible by the use of high-resistance steels, for example a steel containing Cr—Mo with the addition of vanadium. This material makes it possible, at least nominally, to operate the vessel at a high temperature, for example about 450 degrees° C.

A hot wall reactor can cost less than a cold wall reactor of equal capacity and therefore these reactors have attracted a certain interest. However, in practice it has been found that the steel used for hot wall reactors is very difficult to weld. The strength of the welds can be inferior to that of standard steels, under the same conditions. This problem is worsened by the operating conditions in ammonia environment, in particular due to the phenomenon known as high-temperature hydrogen attack and the phenomenon of nitriding that causes fragility and increases the risk of formation of cracks. Due to combined effect of these metallurgic problems and high temperature and pressure, the stress conditions of the vessel are particularly severe.

In practice, despite the use of the aforementioned high-resistance steels, hot wall reactors have been found to show cracks in the vessel after a relatively short operating period. In these cases the replacement of the vessel is quite expensive and takes a long time; simple repair is unsatisfactory because it does not eliminate the causes of the failure. Keeping the damaged reactor in operation is clearly dangerous, with the risk of catastrophic failure.

Moreover, it must be considered that a known type of hot wall reactor is made with partial opening, which does not make it possible, for example, to modify the reactor by introducing a pre-assembled catalytic cartridge, and keeping the existing vessel.

It should also be considered that a known hot wall reactor is realized with a partial opening, which does not allow for example to modify the reactor by insertion of a pre-assembled catalytic cartridge, keeping the existing vessel.

The aforementioned drawbacks are also suffered by plants that comprise two reactors in series, namely a first reactor which is cooled with fluxing, and a second reactor having a simpler construction without such a provision. In practice, the second reactor can comprise a simple catalytic bed that actually lacks an outer cartridge, so that the panels for containing the catalytic bed are directly associated with or facing the inner wall of the vessel, without a cooling flow. In such a configuration, the vessel operates in "hot wall" conditions, i.e. in operation it basically reaches the same temperature as the bed, between 350 and 500° C. and typically around 450° C.

In the prior art, in a plant of the type described above with two reactors in series, the reaction gas is fed entirely to the first reactor and the mixture of reactants and products discharged from the first reactor passes entirely to the second reactor, usually with an intermediate cooling. The second reactor normally has a very long cylindrical vessel, for example of the order of 20 meters, and two openings in the lower part for gas inlet and outlet. The upper and lower base plates are welded to the cylindrical vessel, i.e. no full diameter opening is available. As stated above, until now this condition has made it seem substantially impractical to make an internal cartridge.

SUMMARY OF THE INVENTION

The invention proposes to solve the aforementioned problem. In particular the invention aims to provide an advantageous method to restore operation of a hot wall ammonia reactor with partial opening, damaged by cracks due to the high operating temperatures and phenomena such as hydrogen attack and/or nitriding caused by the highly aggressive environment. The invention also aims to make the operating conditions of an ammonia reactor or plant of the type considered here safer.

The idea forming the basis of the invention is to modify the reactor by making it operate like a cold wall reactor i.e. with a fluxing that cools the vessel, through replacement of the pre-existing catalytic bed with a cartridge bed.

The above purpose is accomplished with a method for modifying a hot wall ammonia reactor with vessel having a partial opening, comprising at least the following operations:
  assembly directly inside the vessel of a catalytic cartridge with modular elements, said modular elements being of a size compatible with the introduction into the vessel through a pre-existing partial opening of the vessel, and each comprising at least one panel;
  the panels of said modular elements forming a substantially cylindrical outer wall of said cartridge, and an annular flux space between said outer wall of the cartridge and an inner wall of the vessel;
  said panels being prearranged with a respective heat insulation layer before introduction into the vessel.

The invention provides removal of an existing catalytic bed and replacement with the aforementioned cartridge, which is pre-assembled in a plurality of modular elements; said elements are introduced into the vessel making use of an available partial opening, and are assembled in loco i.e. inside the vessel itself. Preferably said modular elements are assembled by making angle longitudinal welds in an overlapping area between the edges of two adjacent panels.

The provision of the heat insulation is advantageous since, as the cartridge is assembled inside the vessel, there is not the accessibility to make the outside insulation. The invention solves this problem by pre-arranging the panels with the relative insulation portion on their back. Advantageously the joints are made so as to minimise the thermal bridges and still make it possible to assemble the panels without reverse access. It must be noted that the integrity of the heat insulation is important because damage to the insulation causes problems both for the inside of the reactor and for the pressurised vessel: for example, damage to the insulation can cause: obstruction of the passage sections for the gas with consequent increase in load losses of the reactor; irradiation of the cartridge in the vessel direction, which is dangerous especially during shut downs when fluxing is absent.

Preferably, the modular elements are prefabricated with respective perforated walls and a respective manifold for gas inlet into the catalytic cartridge, obtaining a manifold of the type known as "scallop". Consequently, the prefabricated modular elements incorporate three functions: external insulation, load-bearing cartridge and gas inlet manifold, minimising the number and size of on site welds. The panel substantially represents the load-bearing part of a cartridge module.

Preferably, the method for modifying the reactor provides the use of a quenching gas for the fluxing of the vessel. According to a preferred embodiment, therefore, a flow of quenching gas is fed into said annular flux space between said cartridge and said vessel. The advantage consists of a reduction of the pressure difference that the cartridge must withstand in operation and therefore smaller thickness of the panels that allows easier realization of the necessary longitudinal welds between the panels themselves.

Another aspect of the invention is the following. In an ammonia plant comprising at least one first reactor with vessel cooled through fluxing, and a second reactor in series with the first reactor, said second reactor being of the hot wall type with vessel having a partial opening, the second reactor can advantageously be modified by inside assembly of a catalytic cartridge as described above. In this way the second reactor, which is thermally more stressed due to the absence of cooling, is made to operate as a cold wall reactor.

Preferably, the intervention also foresees the provision of a line for the deviation to the second reactor of a gas flow taken from a feedstock originally directed to the first reactor, and the feeding of said gas flow into the annular flux space obtained in the second reactor. Such a provision basically contemplates the use of a part of the feed gas to the first reactor as fluxing gas of the second reactor. This gas flow by-passes the first reactor, with respect to the original operating configuration. This means a slight drawback from the point of view of the process, but it has been found that such an effect is overcompensated by the advantage of putting the vessel of the second reactor, which is very expensive, back in operation and/or making it more reliable.

The flow rate of fluxing gas is preferably calculated so that the total conversion of the two reactors is such as not to increase the circulation of gas in the synthesis loop, advantageously so as not to have to reduce production or increase consumption. This is made possible, in general, by exploiting a certain overdesign of the second reactor.

The invention allows to recover a vessel damaged by operation at high temperatures in the presence of hydrogen (hydrogen attack) and ammonia (nitriding) after having repaired it and to run the reactor a at lower and therefore less dangerous temperature. There is the advantage of reducing the investment cost and time to put the reactor back in operation, compared to installation of a new reactor, thus reducing the period of time when production is stopped or the time of operation in dangerous conditions, with a vessel that is cracked or has been repaired but still operating at a high temperature.

The invention can also be applied to a reactor that has not yet been damaged (cracked) if for precautionary purposes it is desired to bring it into less severe operating conditions, i.e. reduce the risk of sudden failure.

It should be noted that in the prior art the in situ modification interventions are generally made on cold-wall reactors and with modification of an existing cartridge. In the case of the invention, on the other hand, a catalytic cartridge is made in situ in a reactor designed without a cartridge.

DETAILED DESCRIPTION OF A PREFERRED EMBODIMENT

Figure 1:
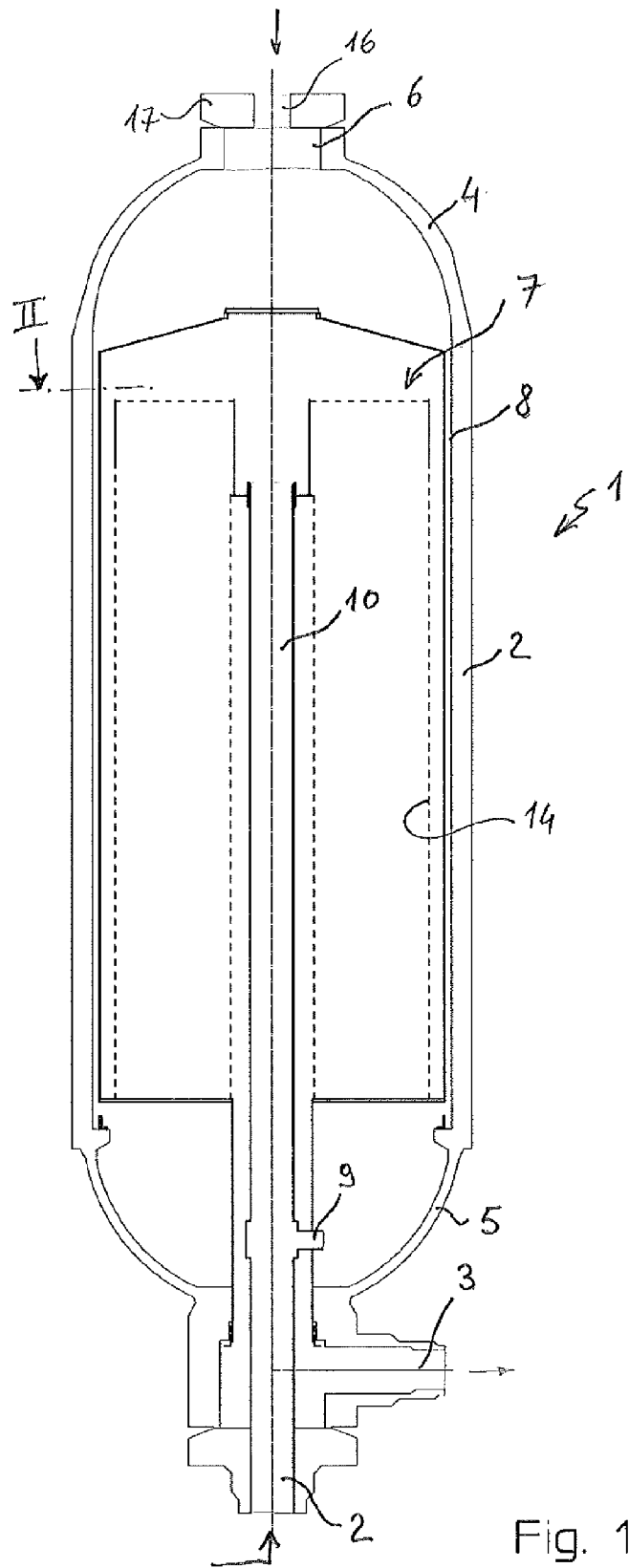
FIG. 1 shows a cross section of an ammonia reactor modified according to an embodiment of the invention.

FIG. 1 shows an ammonia reactor 1, originally installed to operate in hot wall conditions, and modified according to the invention. The reactor 1 comprises a container or vessel 2 and gas inlet 2 and gas outlet 3 openings. The base plates 4 and 5 are welded to the vessel 2; the hemispherical upper base plate 4 is equipped with an opening or manhole 6. No opening is available as wide as the diameter and the reactor 1 is thus named as partial opening. For example, in a known type of ammonia reactor the diameter of the vessel 2 is about 3000 mm, whereas said opening 6 has a diameter of less than one meter, for example 800 mm.

Originally the reactor 1 contains a catalytic bed that is substantially in contact with the vessel 2 and does not provide cooling of said vessel 2. The original bed is removed to proceed with the modification described hereafter.

The reactor 1 is modified through assembly directly inside the vessel 2 of a catalytic cartridge 7. The cartridge 7 is formed from modular elements that are prefabricated and introduced through the available opening 6. The cartridge 7 is such as to leave an annular flux space 8 between its outer wall and said vessel 2. For example, if the diameter of the vessel is 3000 mm, the diameter of the cartridge can be 2950 mm, obtaining a fluxing space of 25 mm.

In use, a flow rate of fluxing gas is preferably fed through said opening 6. In the example, an inlet opening 16 for a fluxing gas is made in a blind flange 17, which is provided to close the opening 6. The fluxing gas passes into the space (annulus) 8, cooling the vessel 2; through one or more radial inlets 9 it mixes in a central duct 10 with the main feed flow, entering from the opening 2. The mixing in the duct 10 takes the reactant gases to the optimal temperature, the gas entering from 2 generally being at a temperature higher than the optimal value.

The flow then crosses the bed of the cartridge 7 with axial-radial flow and the products are collected at the outlet opening 3. The inlet of the gas into the catalytic bed occurs in part through manifolds in the upper part, and in part through perforated walls 14.

Figure 2:
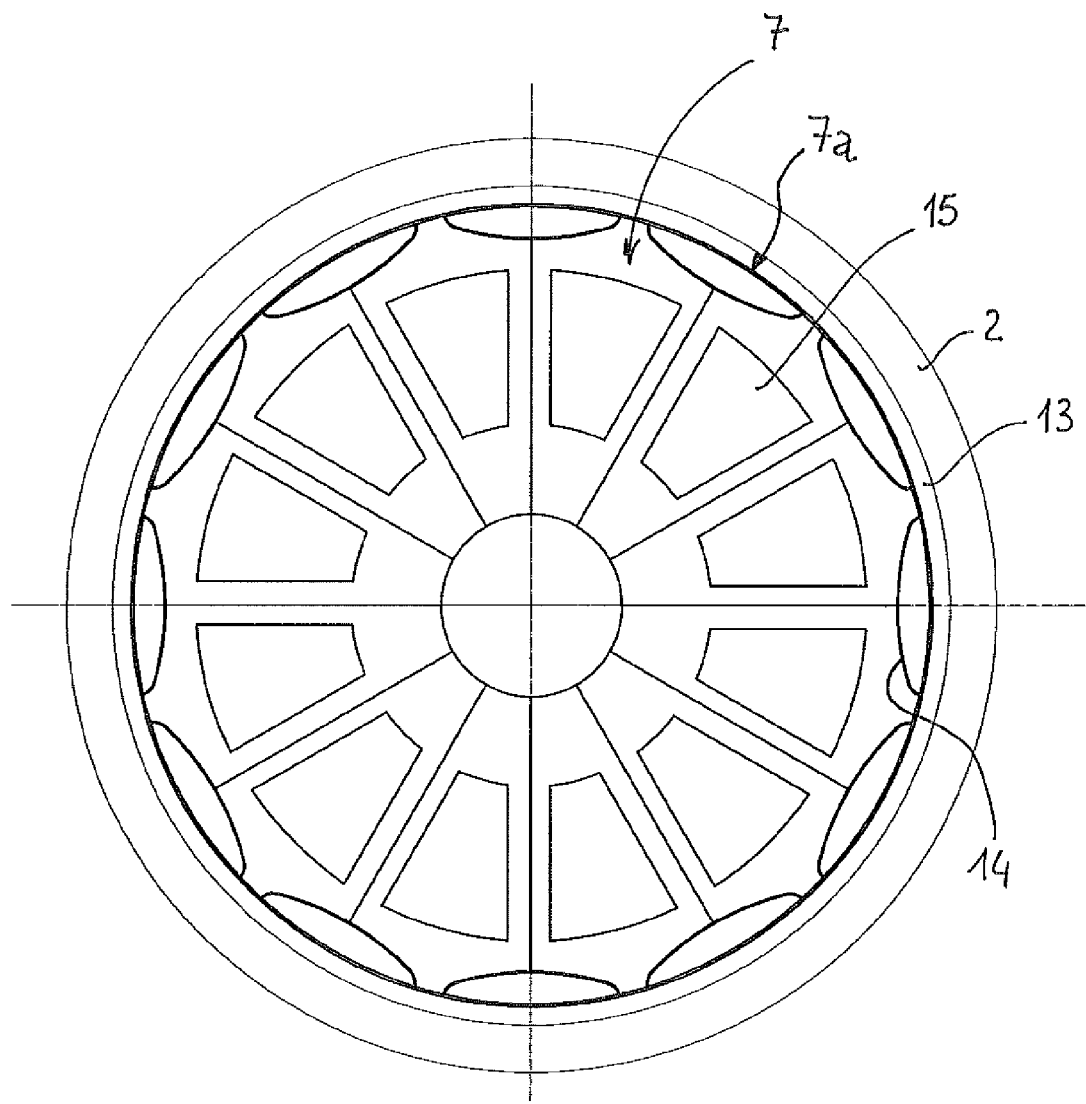
FIG. 2 schematically shows a section of the reactor according to the plane indicated by the line II in FIG. 1.
Figure 3:
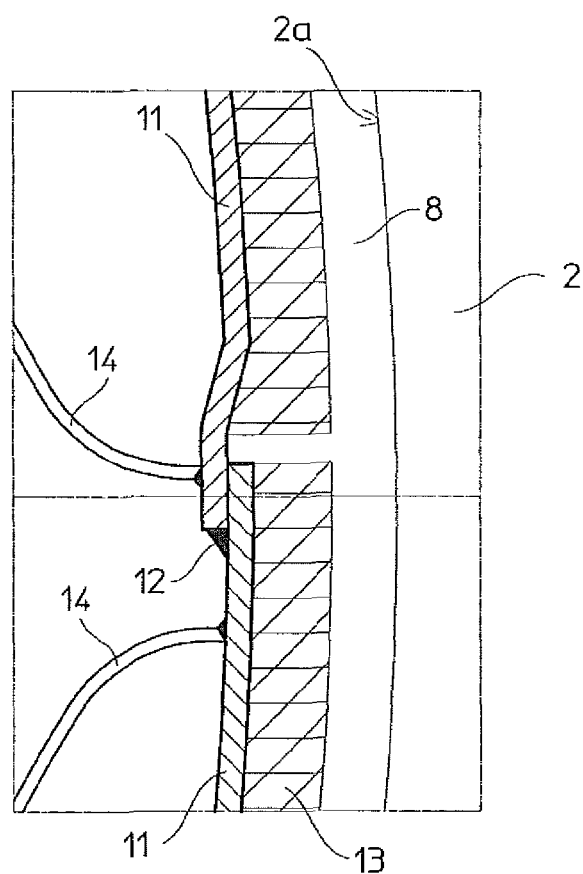
FIG. 3 shows a detail of the joint between two panels forming the wall of the cartridge of the reactor of FIG. 1.

Referring in greater detail to FIGS. 2 and 3, the cartridge 7 has a substantially cylindrical outer wall indicated as 7a, which is formed from curved panels 11 of the aforesaid modular elements; the panels 11 are joined in loco (after insertion in the vessel) by angle longitudinal welds 12, in an overlapping area between two adjacent panels 11.

Each panel 11 is prepared with a respective heat insulation layer 13, so that when assembly of the cartridge 7 is complete, the outer wall 7a is surrounded by an insulating outer layer 13 without solution of continuity. In the detail of FIG. 3 it is also possible to see the fluxing space or annulus 8, between the inner wall 2a of the vessel 2, and the outer surface of the cartridge and relative insulation 13. The figure also shows the gas-permeable walls 14, preferably equipped with holes or slits, for example of the "slotted" type.

FIG. 3 also shows one of the gas inlet manifolds 15 of the "scallop" type that allows the inlet of the gas in a substantially axial direction, from the top part of the cartridge 7.

A preferred aspect of the invention provides use of a flow rate of quenching gas for the fluxing of the reactor 1 so modified.

It is known to feed a reactor with a portion of gas (main inlet) previously heated above the reaction temperature, and with a minor portion of gas which is not heated and therefore at a lower temperature (indeed known as quenching gas); the mixing between said two portions takes the reactants to the correct reaction temperature. An aspect of the invention consists of using said flow of quenching gas as fluxing gas of the modified reactor.

The use of the quenching gas has the advantage of substantially reducing the pressure difference (delta p) outside of the cartridge, which is reduced for example to a value substantially below 1 bar, for example to just 0.3 bar, instead of a value that is generally greater than 1 bar. Consequently, the mechanical stress to which the panels 11 and relative welds 12 are subjected in operation is reduced. In order to withstand a delta p of 2 or 3 bar, it is generally required to have a thickness of the panels 11 between 20 and 25 mm; the fluxing with the quenching gas allows thickness reduction to about 10 mm with easier making of the welds 12.

Figure 4:
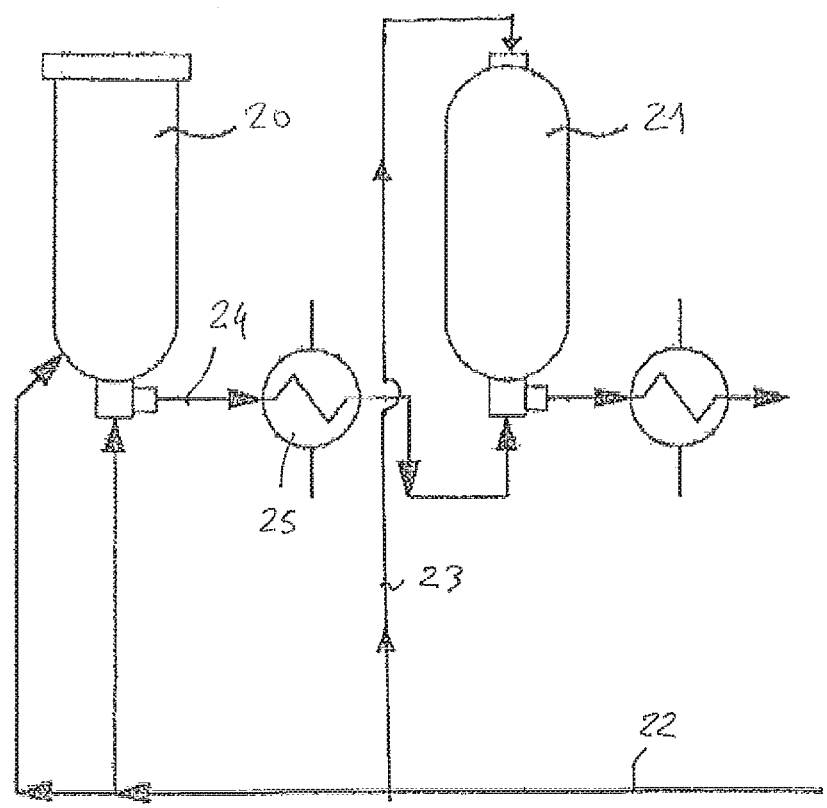
FIG. 4 shows a diagram of a possible application of the invention to a plant with two ammonia reactors in series.

FIG. 4 shows an example of arrangement of a reactor 20, cooled with fluxing (cold wall), and reactor 21 not cooled (hot wall), in series with the first. According to the original design, the charge of reactant gases 22 is fed entirely to the first reactor 20, and the flow 24 of reactants/products passes to the subsequent reactor 21, operating in series, after cooling in a heat exchanger 25.

In one of the embodiments of the invention, the reactor 21 is modified by inside assembly of a catalytic cartridge and making an annulus between cartridge and vessel, substantially as in FIG. 1. Moreover, a flow 23 is taken from the stream 22 and fed as fluxing gas and vessel coolant to the reactor 21, more specifically to said annulus obtained in the reactor 21. It should be noted that said flow 23 basically by-passes the reactor 20. The reduction in reactants available at the reactor 20 is however compensated by the advantage of recovering the reactor 21 and/or making it more reliable.

The invention claimed is:

1. A method for modifying a hot wall ammonia reactor with a vessel having a partial opening, comprising the steps of:
providing modular elements of a catalytic cartridge, said modular elements being of a size compatible with introduction into the vessel through a pre-existing partial opening of the vessel, and each modular element comprising at least one panel;
prearranging said panel(s) with a respective heat insulation layer before introduction into the vessel; and
assembling the catalytic cartridge directly inside the vessel,
wherein the panel(s) of said modular elements form a substantially cylindrical outer wall of said cartridge, and an annular flux space between said outer wall of the cartridge and an inner wall of the vessel.

2. The method for modifying an ammonia reactor according to claim 1, wherein said modular elements being assembled inside the vessel by making angle longitudinal welds in an overlapping area between the edges of two adjacent panels.

3. The method for modifying an ammonia reactor according to claim 1, wherein said modular elements comprising respective perforated walls and a respective manifold for gas inlet into the catalytic cartridge.

4. The method for modifying an ammonia reactor according to claim 1, wherein said reactor being originally fed with a main flow of heated gas, and with a quenching gas flow at a lower temperature, the method providing the feeding of least one part of said quenching gas flow into said annular flux space obtained after assembly of said cartridge, said part of quenching gas being used in operation as fluxing and cooling gas of the vessel.

5. A method for modifying an ammonia plant comprising at least a first reactor with vessel cooled by fluxing, and a second reactor in series with the first reactor, said second reactor being of the hot wall type with vessel having a partial opening, the method comprising assembling a catalytic cartridge according to claim 1 in the vessel of said second reactor.

6. The method for modifying an ammonia plant according to claim 5, further comprising the provision of a line for deviation to said second reactor of a gas flow taken from a feedstock originally directed to the first reactor, said gas flow being fed, in operation, into the annular flux space obtained in the second reactor.

7. The method for modifying an ammonia plant according to claim 6, wherein in operation the flow rate of flux gas is such as not to increase the overall flow rate of gas circulating in the synthesis loop.

* * * * *